(12) United States Patent
Yoshihiro et al.

(10) Patent No.: US 8,918,633 B2
(45) Date of Patent: Dec. 23, 2014

(54) INFORMATION PROCESSING DEVICE, INFORMATION PROCESSING SYSTEM, AND PROGRAM

(75) Inventors: Yano Yoshihiro, Tokyo (JP); Ishihira Kaoru, Tokyo (JP); Nakamura Satoshi, Tokyo (JP); Ozeki Ichiro, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 1240 days.

(21) Appl. No.: 11/190,976

(22) Filed: Jul. 28, 2005

(65) Prior Publication Data

US 2006/0018484 A1    Jan. 26, 2006

Related U.S. Application Data

(63) Continuation of application No. PCT/JP2004/014329, filed on Sep. 30, 2004.

(30) Foreign Application Priority Data

Sep. 30, 2003   (JP) ................................. 2003-340798
Mar. 16, 2004   (JP) ................................. 2004-074220

(51) Int. Cl.
  *H04L 29/06*       (2006.01)
  *G06F 21/34*       (2013.01)
  *G06F 21/62*       (2013.01)

(52) U.S. Cl.
  CPC ........ *G06F 21/34* (2013.01); *G06F 2221/2153* (2013.01); *G06F 21/6218* (2013.01)
  USPC .......................................... 713/153; 713/165

(58) Field of Classification Search
  USPC ................ 713/153, 165, 170–171, 189, 193;
    711/100–105, 111–112, 163–164;
    380/202, 239, 241, 259–264, 37, 42,
    380/277, 28–30; 726/2–6, 27, 30
  See application file for complete search history.

(56) References Cited

U.S. PATENT DOCUMENTS 5,584,022 A    12/1996   Kikuchi et al. ............... 395/609
6,085,323 A     7/2000   Shimizu et al. .............. 713/201
(Continued)

FOREIGN PATENT DOCUMENTS

| JP | 62-134679  | 6/1987 |
| JP | 6-187220   | 7/1994 |
| JP | 08-087440  | 4/1996 |
| JP | H09-179768 | 7/1997 |

(Continued)

OTHER PUBLICATIONS

Notice of Reasons for Rejection issued to JP Application No. 2009-125185 mailed Jun. 14, 2011 (Japanese language only).

*Primary Examiner* — Edward Zee
*Assistant Examiner* — Leynna Truvan
(74) *Attorney, Agent, or Firm* — Bacon & Thomas, PLLC

(57) ABSTRACT

The present invention provides an information processing device, an information processing system, and a program capable of improving security and convenience. An information processing system (1) includes an IC card (30) which stores an encryption key and a registered password and allows the encryption key to be read when the IC card (30) has authenticated the user as an authorized user based on the registered password, and an information processing device (10) which stores folder information in which the folder name, path, and hash value of the encryption key are associated, when a request to save data in the folder has been issued from the user, decides whether or not an encryption key corresponding to the folder is included in the encryption key read from the IC card (30) based on the folder information, encrypts the request target data using the corresponding encryption key when the information processing device (10) has decided "YES", and stores the encrypted data.

23 Claims, 12 Drawing Sheets

(56) References Cited

U.S. PATENT DOCUMENTS

| | | | |
|---|---|---|---|
| 6,378,071 B1 | 4/2002 | Sasaki et al. | 713/165 |
| 6,446,209 B2 * | 9/2002 | Kern et al. | 713/193 |
| 6,463,151 B1 * | 10/2002 | Iitsuka et al. | 380/201 |
| 6,941,456 B2 * | 9/2005 | Wilson | 713/160 |
| 7,146,505 B1 * | 12/2006 | Harada et al. | 713/185 |
| 7,428,751 B2 * | 9/2008 | Temudo de Castro et al. | 726/10 |
| 7,451,147 B1 * | 11/2008 | Kao et al. | 707/9 |
| 7,487,366 B2 * | 2/2009 | Umebayashi et al. | 713/193 |
| 7,571,315 B1 * | 8/2009 | Smith | 713/158 |

FOREIGN PATENT DOCUMENTS

| | | |
|---|---|---|
| JP | 6-270784 | 10/1997 |
| JP | H10-260903 | 9/1998 |
| JP | 10-301856 | 11/1998 |
| JP | 2000-174746 | 6/2000 |
| JP | 2000-286957 | 10/2000 |
| JP | 2001-345796 | 12/2001 |
| JP | 2003-110548 | 4/2003 |
| JP | 2003-173284 | 6/2003 |
| WO | WO 03/027816 | 4/2003 |

* cited by examiner

30A

30B

30C

| FILE ATTRIBUTE INFORMATION | TIME INFORMATION |
|---|---|
| TEXT FILE(.txt) | 9:00～17:00 |
| WORD PROCESSING APPLICATION(.doc) | 7:00～24:00 |
| SPREADSHEET APPLICATION(.xls) | 0:00～24:00 |
| ... | ... |

INFORMATION PROCESSING DEVICE, INFORMATION PROCESSING SYSTEM, AND PROGRAM

TECHNICAL FIELD

The present invention relates to an information processing device which processes and stores data according to a program, an information processing system, and a program for execution by the information processing device.

BACKGROUND ART

In a conventional information processing system which writes and stores data in a storage device such as a magnetic disk, data processed by an application program executed by a computer is directly written and stored in the storage device. In the case where an unauthorized person uses the computer or another computer accesses the storage device through a communication line such as the Internet, data stored in the storage device may be illegally seen and rewritten, whereby secrets may be leaked or data may be falsified. In the case where the magnetic disk which stores data such as a hard disk is stolen or a hard disk is disposed, secrets may also be leaked. Therefore, an encryption/decryption/digital signature generation/verification device which encrypts data and stores the encrypted data in a storage device has been proposed (see patent document 1, for example).

The invention in the patent document 1 allows the user to perform encryption or the like without inputting a password each time the user performs encryption or the like. However, the user performs encryption by designating the encryption target data stored in the storage device. In the case of decrypting data, the user performs decryption by designating the decryption target data. Therefore, since the user must designate the target data each time the user performs encryption or decryption, the operation becomes troublesome and convenience is decreased. In the case of decrypting the encrypted data and encrypting the data after updating, the user may forget to perform the encryption operation.

In the invention in the patent document 1, since the encryption key used for encryption is encrypted and stored in the device while being associated with the encrypted file, that is, both the encryption key and the encrypted data are stored, secrets may be leaked or data may be falsified when an unauthorized person steals the storage device such as a hard disk and deciphers the encryption key.

In order to improve convenience by allowing predetermined persons to use encrypted data in common, a plurality of predetermined persons may be allowed to use a common encryption key (group key). In this case, since the user must selectively use different types of encryption keys depending on the encryption target data, the user must designate the encryption key each time the user performs encryption or decryption, whereby convenience may be decreased.

Moreover, since the computer used by the user authenticates the user as an authorized user instead of a key management computer which manages the encryption keys and provides the encryption key to the user, an unauthorized person may acquire the encryption key by issuing an invalid request to the key management computer from an unauthorized computer.

Patent document 1: JP-A-9-270784 ([0026] to [0053], FIGS. 4 and 6)

DISCLOSURE OF THE INVENTION

Problems to be Solved by the Invention

An objective of the present invention is to provide an information processing device, an information processing system, and a program capable of improving security and convenience.

Means for Solving the Problems

The present invention achieves the above objective by the following means. The following description is given using symbols corresponding to embodiments of the present invention so that the present invention is readily understood. However, the present invention is not limited thereto. Specifically, the first invention provides an information processing device (10, 10-2, 10-3, 10-4), comprising: encryption information storage means (19, 19-4) for storing encryption information in which a folder or a file is associated with identification information of a corresponding encryption key; encryption key decision means (115, S440) for deciding, when a request to save data in the folder or the file has been issued from a user, whether or not an encryption key corresponding to the request target data is included in an encryption key which can be used by the user based on the encryption information stored in the encryption information storage means; data encryption means (111) for encrypting the request target data using the encryption key corresponding to the data when the encryption key decision means has decided "YES"; nonvolatile storage means (19, 19-4) for storing the save target data; and write means (113, 113-3) for writing the data encrypted by the data encryption means in the nonvolatile storage means.

The second invention provides the information processing device (10, 10-2, 10-3, 10-4) as defined in the first invention, wherein the data encryption means performs encryption which does not cause a data size to be changed before and after encryption and/or encryption which does not rewrite attribute information of the folder or the file.

The third invention provides the information processing device (10, 10-2, 10-3, 10-4) as defined in the first invention, wherein, when a request to read data included in the folder or the file has been issued from a user, the encryption key decision means decides whether or not an encryption key corresponding to the request target data is included in an encryption key which can be used by the user based on the encryption information stored in the encryption information storage means; the information processing device comprising: read means (114) for reading the request target data stored in the nonvolatile storage means when the encryption key decision means has decided "YES"; and data decryption means (112) for decrypting the data read by the read means using the corresponding encryption key.

The fourth invention provides the information processing device (10, 10-2, 10-3, 10-4) as defined in the first invention, wherein the encryption information storage means stores the encryption information in which a folder or a file designated by a user is associated with identification information of an encryption key which can be used by the user according to instructions from the user.

The fifth invention provides the information processing device (10, 10-2, 10-3, 10-4) as defined in the first invention, wherein the encryption information storage means stores the encryption information in which identification information of the folder or the file is associated with encryption key identification information including a hash value of the encryption key.

The sixth invention provides the information processing device (10, 10-2, 10-3, 10-4) as defined in the first invention, wherein the data encryption means and/or the data decryption means encrypts or decrypts only data having a predetermined attribute.

The seventh invention provides the information processing device (10, 10-2, 10-3) as defined in the first invention, comprising: time acquisition means; wherein the encryption information storage means stores the encryption information in which the folder or the file, the identification information of the corresponding encryption key, and corresponding time information are associated; the information processing device comprising: time decision means (115) for deciding, when a save request or a read request has been issued from a user, whether or not to respond to the request based on time indicated by the time acquisition means and time information corresponding to the request target data stored in the encryption information storage means.

The eighth invention provides the information processing device (10, 10-2, 10-3) as defined in the seventh invention, wherein the encryption information storage means stores the encryption information in which time information corresponding to an attribute of the folder or the file is associated with the folder or the file.

The ninth invention provides the information processing device (10-3) as defined in the first invention, wherein, when a request to save data of a file in an open state has been issued, the data encryption means encrypts the file using a corresponding encryption key only when the save request is a data save request upon completion of editing of the file.

The tenth invention provides the information processing device (10, 10-2, 10-3, 10-4) as defined in the first invention, wherein the data encryption means encrypts only a file designated by a user in advance and/or a file in a folder designated by a user in advance.

The eleventh invention provides an information processing system (1, 1-3), comprising: the information processing device (10, 10-3) as defined in the first invention; and a portable information storage medium (30) which stores an encryption key including a personal key and/or a group key or an element of the encryption key; wherein the information processing device includes external read means (16) for reading information stored in the portable information storage medium; and wherein, when a save request or a read request has been issued, the encryption key decision means of the information processing device decides whether or not an encryption key or an element corresponding to the request target data is included in the encryption key or the element read by the external read means from the portable information storage medium based on the encryption information stored in the encryption information storage means.

The twelfth invention provides the information processing system (1, 1-3) as defined in the eleventh invention, wherein the portable information storage medium stores authentication information for authenticating an authorized user, includes authentication decision means (32) for deciding whether or not to authenticate a user as the authorized user based on the authentication information and user input information input from the information processing device, and allows the external read means of the information processing device to read the encryption key or the element stored in the portable information storage medium when the authentication decision means has decided "YES".

The thirteenth invention provides the information processing system (1, 1-3) as defined in the eleventh invention, wherein the portable information storage medium stores device identification information for identifying the information processing device, and allows the encryption key or the element to be read when a request is issued from the information processing device indicated by the device identification information.

The fourteenth invention provides an information processing system (1-2), comprising: the information processing device (10-2) as defined in the first invention; and a key management device (40) which includes authentication information storage means (46) for storing authentication information for authenticating an authorized user, authentication decision means (41) for deciding whether or not to authenticate a user as the authorized user based on the authentication information stored in the authentication information storage means and user input information received from the information processing device, encryption key storage means (46) for storing an encryption key including a personal key and/or a group key or an element of the encryption key which can be used by the authorized user decided by the authentication decision means, and transmission means (45) for transmitting the encryption key or the element to the information processing device when the authentication decision means has decided "YES", and is connected with the information processing device through a communication line; wherein the information processing device includes transmission means for transmitting the user input information to the key management device, and reception means (20) for receiving the encryption key or the element which can be used by the authorized user authenticated by the authentication decision means of the key management device based on the user input information from the key management device; and wherein, when a save request or a read request has been issued, the encryption key decision means of the information processing device decides whether or not an encryption key or an element corresponding to the request target data is included in the encryption key or the element received by the reception means from the key management device based on the encryption information stored in the encryption information storage means.

The fifteenth invention provides the information processing system (1-2) as defined in the fourteenth invention, wherein the encryption key storage means of the key management device stores device identification information for identifying the information processing device while associating the device identification information with the encryption key or the element, and the transmission means transmits the encryption key or the element only to the information processing device indicated by the device identification information corresponding to the encryption key or the element.

The sixteenth invention provides the information processing system (1, 1-2, 1-3) as defined in the eleventh invention, wherein the information processing device does not respond to a save request and/or a read request from a user when a communication path with an external device other than a predetermined external device including the portable information storage medium or the key management device which has provided the encryption key or the element is established.

The seventeenth invention provides the information processing system (1, 1-2, 1-3) as defined in the ninth invention, wherein the information processing device includes encryption key deletion means (116) for deleting the encryption key and/or the element provided from the portable information storage medium or the key management device and stored in the information processing device when a communication path with the portable information storage medium or the key management device is disabled.

The eighteenth invention provides the information processing system (1, 1-2, 1-3) as defined in the eleventh invention, wherein the portable information storage medium or the key management device stores device identification information for identifying the information processing device while associating the device identification information with the encryption key or the element; and wherein the information processing device includes device identification information decision means for deciding whether or not to respond to a save request or a read request from a user based on the device identification information read from the portable information storage medium by the external read means or the device identification information received from the key management device and corresponding to the encryption key or the element received by the reception means from the key management device.

The nineteenth invention provides a program for execution by an information processing device (10, 10-2, 10-3, 10-4) including encryption information storage means (19, 19-4) for storing encryption information in which a folder or a file is associated with identification information of a corresponding encryption key, and nonvolatile storage means (19, 19-4) for storing save target data, and performing processing according to an application program, the program comprising: a first decision procedure for deciding, when a request to write data into the folder or the file has been issued from the application program (S410, S420), whether or not an encryption key corresponding to the request target data is included in an encryption key which can be used by a user based on the encryption information stored in the encryption information storage means (S440); a data encryption procedure for encrypting the request target data using the encryption key corresponding to the data when "YES" in the first decision procedure (S460); and a write procedure for writing the data encrypted in the data encryption procedure into the nonvolatile storage means (S470).

The twentieth invention provides the program as defined in the nineteenth invention, comprising: a second decision procedure for deciding, when a request to read data included in the folder or the file has been issued from the application program (S410, S420), whether or not an encryption key corresponding to the request target data is included in an encryption key which can be used by the user based on the encryption information stored in the encryption information storage means (S440); a read procedure for reading the request target data stored in the nonvolatile storage means when "YES" in the second decision procedure (S490); and a data decryption procedure for decrypting the data read in the read procedure using the corresponding encryption key (S500).

The twenty-first invention provides the program as defined in the nineteenth invention, wherein the first and/or second decision procedure decides whether or not an encryption key or an element of the encryption key corresponding to the request target data is included in an encryption key or an element of the encryption key which can be used by an authorized user input from an external device (30, 40) which has authenticated the user as the authorized user.

The twenty-second invention provides the program as defined in the nineteenth invention, wherein, when a write request for a file in an open state has been issued from the application program (S410, S420), the data encryption procedure encrypts the file using the corresponding encryption key only when the write request is a save request upon completion of editing of the file (S411).

The twenty-third invention provides the program as defined in the nineteenth invention, wherein the data encryption procedure encrypts only a file designated by a user in advance and/or a file in a folder designated by a user in advance.

Effect of the Invention

According to the information processing device, the information processing system, and the program of the present invention, the following effects can be obtained.

(1) Since the information processing device stores the encryption information, and, upon receiving a save request from the user, automatically encrypts and stores the target file based on the encryption information, the information processing device does not cause the user using the application program such as a word processing application to be conscious of encryption and eliminates problems to the user in performing the encryption operation, whereby convenience to the user is improved while improving security. Moreover, unauthorized encryption by an unauthorized person is prevented by using the encryption key which can be used by the user for encryption.

(2) Since the information processing device performs encryption which does not cause the data size and the attribute information to be changed before and after encryption, it is impossible to discriminate the encrypted data (secret information) even if an unauthorized person sees the output of the display or the like. Therefore, leakage of the secret information is prevented, whereby security is improved. Moreover, the memory region is effectively utilized by preventing an increase in data size due to encryption.

(3) Since the information processing device automatically decrypts the target data based on the encryption information upon receiving a read request from the user, the information processing device does not cause the user to be conscious of decryption and eliminates problems to the user in performing the decryption operation, whereby convenience to the user is improved while improving security.

(4) Since the information processing device performs automatic encryption according to the user's intention, such as selective encryption using the personal key and the group key, by storing the encryption information associated according to the instructions from the user, convenience to the user is improved.

(5) Encryption and decryption based on appropriate folder information is reliably performed by storing the encryption information with which the hash value of the encryption key is associated, whereby encryption and decryption of data using an unauthorized encryption key is prevented. The possibility of leakage of the encryption key is generally decreased by storing only the hash value and appropriately receiving the encryption key from the external device such as the portable information storage medium. Moreover, encryption and decryption based on appropriate encryption information is reliably performed by storing the encryption information with which the folder or file identification information such as the folder name (file name) and the path is associated.

(6) Since the information processing device performs encryption and decryption only for data having a predetermined attribute, encryption processing for data of a file which need not be encrypted is prevented, whereby the processing efficiency is improved.

(7) The file access conditions are more finely set by deciding whether or not to respond to the user's save request or read request based on the time information associated with each folder, file, or attribute, whereby security is improved.

(8) Leakage of the encryption key is prevented by using the encryption key stored in the portable information storage medium such as an IC card or IC tag with a high degree of security for the stored information for encryption. Moreover, security is improved by performing communication between the information processing device and the portable information storage medium without going through a communication line such as a network which may be tapped. An improvement in convenience is achieved by using not only the personal key but also the group key for encryption and decryption. In particular, a further improvement in convenience is achieved by allowing the information processing devices to use in common the nonvolatile storage means which stores the encrypted data. Leakage of the encryption key is prevented, even if the information stored in the portable information storage medium is leaked, by storing the element of the encryption key in the portable information storage medium.

(9) Accurate authentication is achieved by allowing the encryption key to be read when the portable information storage medium has authenticated the user as the authorized user, whereby unauthorized reading of the encryption key is prevented. Moreover, leakage of the authentication information is prevented.

(10) The information processing device which can be provided with the encryption key is limited by allowing the encryption key to be read when a request has been issued from a predetermined information processing device to the portable information storage medium, whereby leakage of the encryption key is prevented to improve security.

(11) Since the key management device collectively manages the authentication information and the encryption keys, the management of the encryption keys such as alteration of each user's setting is simplified. Moreover, leakage of the encryption key is prevented, even if the information stored in the key management device is leaked, by storing the element of the encryption key in the key management device.

(12) The information processing device which can be provided with the encryption key is limited by allowing the key management device to transmit the encryption key only to a predetermined information processing device corresponding to the encryption key, whereby leakage of the encryption key is prevented to improve security.

(13) Leakage of the encryption key and secret information such as data is prevented by not responding to the request from the user when a communication line with an external device other than a predetermined external device is established.

(14) By deleting the encryption key provided from the portable information storage medium or the key management device when the communication path with the portable information storage medium or the key management device is disabled such as when the information processing device logs off or the portable information storage medium is moved, the identification information of the encryption key such as the hash value is allowed to remain in the information processing device without allowing the encryption key to remain, whereby leakage of the encryption key is prevented.

(15) The information processing device which can use the encryption key is limited by deciding whether or not to respond to the user's request based on the device identification information stored in the portable information storage medium or the key management device, whereby security is improved.

(16) When a request to save data of a file in an open state has been issued, encryption is performed only when the save request is a save request upon completion of editing of the file. Therefore, even if the save operation is repeatedly performed during editing, since the file is not encrypted and is temporarily stored in plaintext during editing, the number of encryptions is reduced, whereby the processing speed is increased.

(17) Since only a file which must be encrypted, such as a file which stores secret data, is encrypted by encrypting only the file designated by the user in advance or the file in the folder designated by the user in advance, the number of encryptions and decryptions is decreased, whereby the processing speed is increased.

BEST MODE FOR CARRYING OUT THE INVENTION

The present invention achieves the objective of improving security and convenience by providing a portable information storage medium which stores an encryption key and authentication information and allows the encryption key to be read when the portable information storage medium has authenticated the user as an authorized user based on the authentication information, and an information processing device which stores encryption information in which folder identification information and a hash value of the encryption key are associated, when a request to save data in the folder has been issued from the user, decides whether or not an encryption key corresponding to the folder is included in the encryption key read from the portable information storage medium based on the encryption information, encrypts the request target data using the corresponding encryption key when the information processing device has decided "YES", and stores the encrypted data.

First Embodiment

FIG. 1 is a block diagram showing a configuration of an information processing device and an information processing system according to the present invention.

An information processing system 1 includes an information processing device 10 and an IC card 30 (30A, 30B, 30C, . . . ). The IC card 30 is inserted into a reader/writer 16 (hereinafter abbreviated as "R/W") of the information processing device 10, and becomes communicable by establishing a communication path with the information processing device 10. The information processing device 10 is a computer which can be used by users, such as employees of the same company, who carry and use the IC cards 30A, 30B, 30C, . . . having the same attribute (users of the IC cards 30A, 30B, and 30C are respectively called users A, B, and C). The information processing device 10 includes a CPU 11, a ROM 12, a RAM 13, and an interface 15 which are connected with a bus 14, the R/W 16, an input section 17, a display 18, and a magnetic disk 19 which are connected with the interface 15, and the like.

The ROM 12 is a nonvolatile read-only memory, and stores basic software such as an operating system (hereinafter abbreviated as "OS"). The CPU 11 is a central processing unit which performs various types of processing according to the OS stored in the ROM 12 or a program (application program) read from the magnetic disk 19 and loaded into the RAM 13. The RAM 13 is a volatile memory of which the data stored therein can be rewritten, and is configured to appropriately store a program, data, or the like necessary for the CPU 11 to perform various types of processing.

The CPU 11 realizes an encryption section 111, a decryption section 112, a write section 113, a read section 114, a decision section 115, an encryption key deletion section 116, and the like by executing the program. The encryption section 111 performs encryption which does not cause the data size to be changed before and after encryption based on an encryption method such as stream cipher using an encryption key. The encryption section 111 encrypts file data without changing the extension which is file attribute information. The decryption section 112 performs decryption using the encryption key, that is, processing reverse of the processing of the encryption section 111. The write section 113 writes data into the magnetic disk 19, the read section 114 reads data from the magnetic disk 19, and the decision section 115 performs various types of decision processing (see FIG. 7 described later). The encryption key deletion section 116 deletes the encryption key which is read from the IC card 30 and stored in the RAM 13 or the like when the communication path established between the information processing device 10 and the IC card 30 is disabled, such as when the IC card 30 is removed from the R/W 16 or the information processing device 10 logs off.

The interface 15 is configured to manage input/output of the R/W 16, the input section 17, the display 18, and the magnetic disk 19. The interface 15 is also connected with the CPU 11, the ROM 12, and the RAM 13 through the bus 14.

The R/W 16 electrically comes in contact with a contact terminal of the IC card 30, and mediates communication between the CPU 11 and the IC card 30. The input section 17 includes a keyboard, a mouse, and the like, and is operated by the user when the user inputs various instructions, necessary information, or the like. The display 18 is formed by a CRT, LCD, or the like, and is configured to display characters, images, or the like.

The magnetic disk 19 is an external storage device such as a hard disk which appropriately stores data, an application program, or the like which must be accessed at a relatively high speed, or a flexible disk or a magneto-optical disk which appropriately stores data, a program, or the like which may be accessed at a low speed in comparison with the hard disk. An application program such an encryption/decryption application program (hereinafter called "encryption/decryption application") and data necessary for executing the program are stored in the magnetic disk 19. The functions of the encryption/decryption application are described later using FIGS. 5 and 7.

FIG. 2 is a diagram showing a file configuration in a memory region of the magnetic disk 19, and FIG. 3 is a diagram showing folder information stored in the magnetic disk 19.

As shown in FIG. 2, in the memory region of the magnetic disk 19, related files are classified into folders (concept similar to directories), and stored in a hierarchical structure. A file name and a folder name for identifying the file or the folder at least in the memory region are respectively assigned to each file and each folder. A file subordinate to a predetermined folder and having a predetermined attribute is encrypted. A folder with a folder name "X" is called a folder X. This nomenclature also applies to the file.

As shown in FIG. 3, the magnetic disk 19 stores the folder information in a database form. The folder information is information in which the folder is associated with identification information of the encryption key corresponding to the folder, in which folder identification information including the folder name and the path indicating the location of the folder in the magnetic disk 19 are associated with a hash value of the encryption key corresponding to the folder. The data of the file subordinate to the folder designated by the folder information and having a predetermined attribute (extension) is encrypted using the corresponding encryption key and stored in the magnetic disk 19. The hash value is a value generated by using a hash function which is a calculation method of generating a pseudorandom number with a fixed length from given original text. The original text cannot be reproduced from the hash value since the hash function includes an irreversible one-way function, and it is extremely difficult to create different pieces of data having the same hash value.

In this embodiment, the folder name and the path of a folder FA and a hash value KA' of an encryption key KA are stored while being associated. Specifically, as shown in FIG. 2, the folder FA is associated with the hash value KA' of the corresponding encryption key KA, and files A-1 and A-2 subordinate to the folder FA and having a predetermined attribute (extension) (file such as a text file which stores data rewritten by the execution of the application program, for example) are stored in cipher text encrypted using the encryption key KA. A file A-3 is a file having an attribute other than a predetermined attribute, such as an execute form file or a dynamic link library file, and is stored in plaintext. Files B-1 and B-2 subordinate to a folder FB and a file D-1 subordinate to a folder FD are stored in plaintext, and a file C-1 subordinate to a folder FC is encrypted using an encryption key KG1 and stored in an encrypted state. The folder information registration is described later using FIG. 5. The encrypted files A-1 and A-2 have the same size as the size before encryption and have the original extension.

As shown in FIG. 1, the IC card 30 is a portable information storage medium which includes an IC chip (not shown) provided in a card substrate, a contact terminal 31 connected with the IC chip, and the like, receives power supply from an external device such as the R/W 16, and performs contact communication. The portable information storage medium is an information storage medium such as an IC card or an IC tag which safely stores predetermined information on the user who carries the medium, and from which the information can be read from the outside under predetermined conditions.

The IC chip includes a CPU 32 connected with the contact terminal 31, a RAM 33, a ROM 34, and a nonvolatile memory 35 connected with the CPU 32, and the like.

The nonvolatile memory 35 is a rewritable nonvolatile memory such as an EEPROM or FRAM, and stores a program executed by the CPU 32 and data necessary for executing the program. The nonvolatile memory 35 stores an encryption key for data encryption/decryption which can be used by an authorized user of the IC card 30 and a registered password for authenticating the authorized user.

FIG. 4 is an explanatory diagram illustrative of the encryption keys stored in each IC card 30.

As shown in FIG. 4, the nonvolatile memory 35 of the IC card 30A used by the user A stores four encryption keys in total including a personal key KA and three group keys KG1, KG2, and KG3. The personal key is an encryption key which can be used only by the authorized user of the IC card 30, and the group key is an encryption key which can be used by predetermined persons belonging to a group. Specifically, the IC card 30A stores the personal key KA which can be used only by the user A, and the group keys KG1, KG2, and KG3 which can be used by predetermined persons belonging to groups 1, 2, and 3.

The IC card 30B carried by the user B stores three encryption keys in total including a personal key KB which can be used only by the user B and the group keys KG1 and KG4 for the groups 1 and 4, and the IC card 30C carried by the user C stores three encryption keys in total including a personal key KC and the group keys KG2 and KG3 for the groups 2 and 3. The number and the type of the encryption keys stored in the IC card 30 are arbitrary, and are not limited to those described above.

As shown in FIG. 1, the CPU 32 is a central processing unit which loads the program stored in the ROM 34 and the nonvolatile memory 35 into the RAM 33 and executes the program, and has a user authentication decision function. The user authentication decision function is a function of comparing the stored authentication information (registered password) with a password as user input information input by the user through the information processing device 10 by operating the input section 17 of the information processing device 10, and deciding whether or not to authenticate the user as an authorized user of the IC card 30. The IC card 30 writes the decision result in the RAM 33 as a flag. The IC card 30 responds to a call request for the encryption key from the information processing device 10 when the IC card 30 has authenticated the user as an authorized user, and rejects the request from the information processing device 10 when the IC card 30 has not authenticated the user as an authorized user. The IC card 30 also has a blockage function, and never accepts access from the outside when the number of occurrences of unauthentication has reached a predetermined number in the authentication decision by the CPU 32.

FIG. 5 is a flowchart showing startup of the information processing device 10 and folder information registration processing. The following description is given mainly on the processing of the CPU 11 by the execution of the encryption/decryption application.

In steps S100 and S200, the user installs the IC card 30 in the R/W 16 of the information processing device 10, and provides power to the information processing device 10. The information processing device 10 provides a reset signal, power supply, a clock signal, and the like to the IC card 30 to activate the IC card 30 (S210), and the IC card 30 is reset and performs an initial response operation (S110). The information processing device 10 displays a password input request on the display 18, transmits the password input by the user by operating the input section 17 to the IC card 30, and requests authentication (S220). The CPU 32 of the IC card 30 performs a user authentication decision to decide whether or not to authenticate the user as an authorized user of the IC card 30 (S120), writes the authentication result as a flag, and transmits the authentication result to the information processing device 10 (S130).

The information processing device 10 receives the response indicating the authentication result from the IC card 30 (S230). When the user has not been authenticated, the information processing device 10 maintains a log-off state in which the resources of the information processing device 10 cannot be accessed, such as again requesting the user to input the password (after S220). When the user has been authenticated, the information processing device 10 enters a log-in state in which the resources of the information processing device 10 can be accessed, such as accepting input by the user using the input section 17 (S250). The information processing device 10 transmits a read request for the stored encryption key to the IC card 30, and reads all the stored encryption keys for data encryption/decryption from the IC card 30 (S140 and S260). The CPU 11 calculates the hash value of each encryption key (S270), and stores the hash value in the RAM 13 while associating the hash value with the encryption key.

The user A starts up a registration tool of the encryption/decryption application in order to register the folder information (S280). As shown in FIG. 6, the information processing device 10 displays an image or the like for requesting the user to select the encryption target folder and the encryption key corresponding to the selected folder, that is, the encryption key for encrypting the folder, on the display 18 (S290). The user A designates the folder and the encryption key by operating the input section 17, and the information processing device 10 inputs the user's selection information (S300). The information processing device 10 writes and stores the folder name and the path of the selected folder and the hash value of the encryption key created from the selected encryption key stored in the RAM 13 into the magnetic disk 19 while associating them (S310). The information processing device 10 then enters a log-off state by the operation by the user, and the encryption key deletion section 116 deletes the data on the encryption key read from the IC card 30 and stored in the RAM 13 or the like (S320), and finishes the processing (S330). The attribute (extension) of the encryption target file is set in advance by the encryption/decryption application. However, the user may designate the attribute in this folder information registration stage.

FIG. 7 is a flowchart showing file save processing and read processing performed by the information processing device. The save processing and the read processing are described below in that order mainly on the processing of the CPU 11 during execution of the encryption/decryption application.

In a step S400, the information processing device 10 is in a log-in state in which the IC card 30A of the user A is inserted into the R/W 16, the encryption keys KA, KG1, KG2, and KG3 are read from the IC card 30A, and the encryption keys and the hash values KA', KG1', KG2', and KG3' are written and stored in the RAM 13 (see S110 to S140 and S210 to S270 in FIG. 5). The user A issues a request to save the data of the file D-1 in the folder FA, such as dragging the file D-1 and dropping it into the folder FA on the screen of the display 18 using the mouse of the input section 17 (see FIG. 2).

The information processing device 10 detects the access request, and starts the save processing (S410). Specifically, when a data write request has been sent to the OS from the application program used by the user (hereinafter called "user's application"), the encryption/decryption application takes the write request. The encryption/decryption application (decision section 115) refers to the folder information for the folder name and the path of the destination folder into which the request target data is written, and decides whether or not a folder having the same folder name and path is registered in the folder information (S420). When the decision section 115 has decided "YES", the decision section 115 decides whether or not the file designated by the write request is a file having a predetermined encryption target attribute by the extension (S430). When the decision section 115 has decided "NO" in the step S420 or S430, the encryption/decryption application transfers the write request taken from the user's application to the OS, and the OS (write section 113) writes the save target file in plaintext (S480), and finishes the processing (S520).

Since the folder FA is registered in the folder information, the decision section 115 decides "YES" in the step S420. The decision section 115 refers to the hash values of the encryption keys KA, KG1, KG2, and KG3 stored in the RAM 13 for the hash value KA' of the encryption key KA associated with the folder FA in the folder information, and decides whether or not the encryption key having the same hash value is included in the encryption keys (S440). When the encryption key having the same hash value does not exist, the information processing device 10 displays access inhibition on the display 18 (S510), and transfers control to the user's application to finish the save processing (S520).

Since the encryption key KA is stored in the RAM 13, the decision section 115 decides "YES" in the step S440. The encryption/decryption application (encryption section 111) encrypts the file D-1 using the encryption key KA (S450 and S460), and issues a request to write the encrypted file D-1 into the folder FA to the OS. The OS (write section 113) writes the encrypted file D-1 at a location subordinate to the folder FA (S470), and finishes the save processing (S520).

When the user A has issued a request to read the data of the file A-1 included in the folder FA, such as double-clicking the icon of the file A-1 on the screen of the display 18 using the mouse, the information processing device 10 detects the access request and starts the read processing (S410). Specifically, when the data read request has been issued from the user's application to the OS, the encryption/decryption application takes the read request. The encryption/decryption application (decision section 115) decides whether or not the folder including the read target data is registered in the folder information, whether or not the file designated by the request is a file having a predetermined attribute, and whether or not the encryption key having the same hash value is stored in the RAM 13 in the same manner as in the save processing (S420, S430, and S440). When the encryption/decryption application has decided "NO" in the step S420, S430, or S440, the information processing device 10 performs the above-described processing (S480 and S510), and finishes the read processing (S520).

When the encryption/decryption application has decided "YES" in the steps S420, S430, and S440, the encryption/decryption application issues a read request to the OS, and the OS (read section 114) reads the encrypted file A-1 from the magnetic disk 19 (S450 and S490). The encryption/decryption application (decryption section 112) decrypts the file A-1 using the encryption key decided in the step S440 (S500), and sends the decrypted file A-1 to the user's application. The user's application performs processing according to the request from the user, such as displaying the decrypted file A-1 on the display 18, and the information processing device 10 finishes the read processing (S520).

When the user A rewrites the content (data) of the read file A-1 using a word processing application or the like and stores the updated file A-1, the information processing device 10 again encrypts the file A-1 and stores the encrypted file A-1 at a location subordinate to the folder FA in the same manner as in the save processing (S410 to S470).

When the user B inserts the IC card 30B into the R/W 16 and issues a request to read the files A-1 and A-2 subordinate to the folder FA or issues a request to save a file in the folder FA, since the encryption key KA associated with the folder FA is not included in the encryption keys KB, KG1, and KG4 which can be used by the user B, the information processing device 10 displays occurrence of an error (S510), and finishes the processing (S520).

When the user A or B issues a request to read the file C-1 subordinate to the folder FC or issues a request to save a file in the folder FC, since the users A and B can use the encryption key (group key) KG1 associated with the folder FC, the user A or B can read the file C-1 or save a file in the folder FC (S430 to S470, S490, and S500). Since the user C cannot use the encryption key KG1, the user C cannot perform this processing (S440 and S510).

As described above, according to the first embodiment, since the information processing device 10 stores the folder information, and, upon receiving a save request from the user, automatically encrypts and stores the target file based on the folder information, the information processing device 10 does not cause the user using the user's application to be conscious of encryption and eliminates problems to the user in performing the encryption operation, whereby convenience to the user can be improved while improving security.

Since the information processing device 10 performs encryption which does not cause the data size and the file extension to be changed before and after encryption, it is impossible to discriminate the encrypted file (secret information), even if an unauthorized person sees the output of the display 18 or the like. Therefore, leakage of the secret information can be prevented, whereby security can be improved. Moreover, the memory region can be effectively utilized by preventing an increase in data size due to encryption. Since the information processing device 10 automatically decrypts the target file based on the folder information upon receiving a read request from the user, the information processing device 10 does not cause the user to be conscious of decryption and eliminates problems to the user in performing the decryption operation, whereby convenience to the user can be improved while improving security.

Since the information processing device 10 performs automatic encryption according to the user's intention, such as selective encryption using the personal key and the group key, by storing the folder information associated (registered) according to the instructions from the user, convenience to the user can be improved.

Since the information processing device 10 searches for the encryption key used for encryption based on the hash value of the encryption key included in the folder information, encryption and decryption using an appropriate encryption key can be reliably performed, whereby encryption and decryption of data using an incorrect encryption key can be prevented. Moreover, encryption and decryption based on appropriate folder information can be reliably performed by storing the folder information in which the folder name and the path are associated.

Since the information processing device 10 performs encryption and decryption only for data having a predetermined attribute (data of a file having a predetermined extension) in the folder designated by the user in advance, encryption processing for data of a file which need not be encrypted can be prevented, whereby the processing efficiency can be improved.

Moreover, leakage of the encryption key can be prevented by using the encryption key stored in the IC card 30 with a high degree of security for the stored information for encryption. Moreover, security can be improved by performing communication between the information processing device 10 and the IC card 30 without going through a communication line such as a network which may be tapped. An improvement in convenience can be achieved by using not only the personal key but also the group key for encryption and decryption.

Moreover, accurate authentication can be achieved by allowing the encryption key to be read when the IC card 30 has authenticated the user as an authorized user, whereby unauthorized reading of the encryption key can be prevented. Moreover, leakage of the authentication information can be prevented.

Since the encryption key read from the IC card 30 and stored in the information processing device 10 is deleted when the communication path between the information processing device 10 and the IC card 30 is disabled, such as when the information processing device 10 logs off or the IC card 30 is removed from the R/W 16, only the hash value of the encryption key remains in the information processing device 10 without allowing the encryption key to remain, whereby leakage of the encryption key can be prevented.

Moreover, since the IC card 30 has the blockage function, leakage of information can be prevented by the blockage function even if the IC card 30 is lost.

Second Embodiment

FIG. 8 is a block diagram showing a configuration of an information processing device and an information processing system according to the present invention. Sections having the same functions as those in the first embodiment are indicated by the same symbols, and description of these sections is appropriately omitted.

As shown in FIG. 8, an information processing system 1-2 in this embodiment includes an information processing device 10-2, and a key management device 40 connected with the information processing device 10-2 through a communication line 50 such as a wired line such as a telephone line or an optical cable or a wireless communication means such as an infrared communication means.

The information processing device 10-2 includes a communication section 20 such as a modem which is connected with the interface 15 and the communication line 50 and controls communication with the key management device 40 through the communication line 50.

The key management device 40 is a computer which includes a CPU 41, a memory 42 such as a RAM or ROM, and an interface 44 which are connected with a bus 43, a communication section 45 and a magnetic disk 46 which are connected with the interface 44, and the like. The key management device 40 manages the encryption keys which can be used by each predetermined user registered in key management information. Specifically, the key management device 40 collectively manages the encryption keys and the registered password of each user, which are stored in the IC cards 30 in the first embodiment. The CPU 41 has an authentication decision function for deciding whether or not to authenticate an authorized user, and the magnetic disk 46 stores the key management information in a database form. The key management information is information in which user identification information such as a user ID is associated with the encryption key which can be used by the user, the registered password for authenticating an authorized user of the encryption key, and the like.

The information processing device 10-2 issues a request to the key management device 40 instead of the IC card 30 in the first embodiment, and performs registration processing, save processing, and read processing in the same manner as described above (see FIGS. 5 and 7).

The key management device 40 receives the user ID and the input password (user input information) input by the user by operating the input section 17 of the information processing device 10-2 through the information processing device 10-2 and the communication line 50, and makes an authentication decision by comparing the input password with the registered password (authentication information) stored in the magnetic disk 46. The key management device 40 can provide the encryption key, which can be used by the authenticated authorized user, to the information processing device 10-2 only when the user has been authenticated.

As described above, according to the second embodiment, since the key management device 40 collectively manages the user's registered passwords and the encryption keys, the management of the encryption keys such as alteration of each user's setting can be simplified in addition to achieving the effects the same as those of the first embodiment.

Third Embodiment

FIG. 9 is a block diagram showing a configuration of an information processing device and an information processing system according to the present invention.

As shown in FIG. 9, an information processing system 1-3 has a configuration almost the same as the configuration of the information processing system 1 in the first embodiment. The information processing system 1-3 includes an information processing device 10-3 and the IC card 30. The information processing device 10-3 includes a CPU 11-3, the ROM 12, the RAM 13, and the interface 15 which are connected with the bus 14, the R/W 16, the input section 17, the display 18, and the magnetic disk 19 which are connected with the interface 15, and the like.

The CPU 11-3 performs various types of processing according to the OS stored in the ROM 12 and a program read from the magnetic disk 19 and loaded into the RAM 13, and realizes the encryption section 111, the decryption section 112, a write section 113-3, the read section 114, the decision section 115, the encryption key deletion section 116, and the like. The details of the function of the write section 113-3 are described later using FIG. 10.

FIG. 10 is a flowchart showing a part of file save processing of the information processing device during editing. The information processing device 10-3 performs folder information registration processing (see FIG. 5) and file read processing and save processing (see FIG. 7) in the same manner as the information processing device 10 in the first embodiment. FIG. 11 shows processing performed between the steps S410 and S420 in FIG. 7 in the save processing. The processing of the CPU 11-3 during execution of the encryption/decryption application is mainly described below with reference to FIG. 7.

As shown in FIG. 7, the user A double-clicks the icon of the file A-1 on the screen of the display 18 using the mouse, and the information processing device 10-3 inputs a request to read the file A-1, decrypts the file A-1, and displays a window in a state in which the file A-1 is open on the display 18 (see S410 to S450, S490, and S500).

The user A edits the file such as rewriting the file A-1 by operating the input section 18 and issues a request to save the rewritten data, and the information processing device 10-3 detects the request (S410 in FIGS. 7 and 11). When the save request is a temporary save request, the write section 113-3 of the information processing device 10-3 writes the file A-1 in the magnetic disk 19 in plaintext without performing encryption to temporarily store the file A-1 (S411 and S412 in FIG. 10). When the save request is a data save request upon completion of editing of the file A-1, such as a request to close the file A-1, the write section 113-3 performs the processing in the steps S420 to S470 in FIG. 7 to encrypt and store the file A-1. After encryption, the information processing device 10-3 deletes the data temporarily stored in the step S412.

As described above, according to the third embodiment, when a request to save data of a file in an open state has been issued, encryption is performed only when the save request is a save request upon completion of editing of the file. Therefore, even if the save operation is repeatedly performed during editing, since the file is not encrypted and is temporarily stored in plaintext during editing, the number of encryptions is reduced, whereby the processing speed can be increased in addition to achieving the effects the same as those of the first embodiment.

(Modification)

The present invention is not limited to the above-described embodiments, and various modifications and variations may be made. Such modifications and variations are also within the scope of equivalence of the present invention. In each embodiment, the information processing device 10, 10-2, or 10-3 reads the encryption key from the IC card 30 (or the key management device 40) after authentication of an authorized user at the time of startup (S260 in FIG. 5). However, the encryption key may be read when the encryption key or the hash value of the encryption key is required during the folder information registration, save processing, read processing, or the like. The timing at which the information processing device 10, 10-2, or 10-3 reads the encryption key is not limited insofar as the timing is after authentication but before the necessity arises.

The IC card 30 or the key management device 40 may store in advance the hash value of the encryption key while associating the hash value with the encryption key. This reduces the processing time for calculating the hash value.

In each embodiment, the information processing device 10, 10-2, or 10-3 stores the folder information in which the folder name, the path, and the hash value of the encryption key are associated as the encryption information. However, the information processing device 10, 10-2, or 10-3 may store the folder information in which the file name, the path, and the hash value of the encryption key are associated as the encryption information, and manage encryption and decryption in file units. This improves convenience since detailed management can be achieved and even files subordinate to a single folder can be encrypted using the personal keys of different users, for example.

The folder information and the file information for identifying the encryption target file may be stored in the IC card 30.

In each embodiment, the IC card 30 or the key management device 40 stores the encryption key. However, the IC card 30 or the key management device 40 may store an element of the encryption key instead of the encryption key, or the encryption key and the element of the encryption key, and the information processing device 10, 10-2, or 10-3 may generate the encryption key based on the element. The element of the encryption key is a constituent element indispensable for generating the encryption key, and differs between the encryption keys. For example, the information processing device 10, 10-2, or 10-3 generates the encryption key by performing predetermined calculation for the element. Another element of a single encryption key may be stored at another location in the information processing system 1, 1-2, or 1-3 (information processing device 10, 10-2, or 10-3, system management server, or the like), and the information processing device 10, 10-2, or 10-3 may generate the encryption key based on the element provided by the IC card 30 or the key management device 40 and another element.

Leakage of the encryption key can be prevented, even if the information stored in the IC card 30 or the key management device 40 is leaked, by storing the element of the encryption key.

In each embodiment, the information processing device 10, 10-2, or 10-3 stores the folder information in the magnetic disk 19. However, the information processing device 10, 10-2, or 10-3 may receive the folder information from a predetermined server through the communication line 50, store the received folder information in the RAM 13 or the like, and use the stored folder information for processing. It suffices that the folder information be stored in the information processing device 10, 10-2, or 10-3 at least in a period in which encryption or decryption processing is required. The period of time in which the folder information is stored in the information processing device 10, 10-2, or 10-3 and the storage location are not particularly limited.

The folder information may be divided and separately stored at a plurality of predetermined locations such as a plurality of servers. The folder information may be divided and separately stored at a plurality of predetermined locations so that effective information is not obtained unless the divided pieces of folder information are collected and processed using a predetermined method. Since all of the above-mentioned conditions must be satisfied, leakage of the folder information can be prevented.

In each embodiment, the information processing device 10, 10-2, or 10-3 may include a non-predetermined communication path detection section which detects a communication path established with an external device other than a predetermined external device such as the IC card 30, the key management device 40, or an external device which is permitted in advance, and may not respond to a save request or a read request from the user, such as displaying occurrence of an error, when the non-predetermined communication path detection means has detected establishment of a non-predetermined communication path. When the non-predetermined communication path detection section has detected establishment of a non-predetermined communication path, the encryption key deletion section 116 may delete the stored encryption key. In the case where the information processing device 10, 10-2, or 10-3 establishes a communication path with a non-predetermined external device, the information stored in the information processing device 10, 10-2, or 10-3 may be leaked. Therefore, this modification eliminates the possibility of leakage, whereby security can be improved.

A predetermined external device may be arbitrarily set by enabling the identification information to be registered.

In the first embodiment or the third embodiment, the IC card 30 may store device identification information, and may allow the encryption key to be read from only the information processing device 10 or 10-3 indicated by the device identification information.

The device identification information refers to information specific to the information processing device 10 or 10-3 such as a network address (IP address) and a MAC address, the ID of the information processing device 10 or 10-3 such as an identification symbol, information for authenticating the information processing device 10 or 10-3 such as authentication information, and the like, and is information for identifying the information processing device 10 or 10-3 to which the encryption key may be provided.

In the second embodiment, the key management device 40 may store the device identification information while associating the device identification information with the encryption key, and may provide the encryption key only to the information processing device 10-2 indicated by the corresponding device identification information.

The file access conditions can be more finely set by limiting the information processing device 10, 10-2, or 10-3 which can be provided with the encryption key, whereby security can be improved.

The IC card 30 or the key management device 40 may store the device identification information, and transmit the device identification information in response to a predetermined request from the information processing device 10, 10-2, or 10-3. The information processing device 10, 10-2, or 10-3 may read the device identification information, and the decision section 115 may decide whether or not to respond to a save request or a read request from the user depending on whether or not the device identification information indicates its own device.

This also enables the file access conditions to be finely set, whereby security can be improved.

In the first embodiment or the third embodiment, the IC card 30 and the R/W 16 of the information processing device 10 or 10-3 perform communication using the contact method. However, the IC card 30 and the R/W 16 may perform non-contact communication. The communication method is not limited.

The IC card 30 stores the encryption key for data encryption/decryption which can be used by an authorized user and the registered password for authenticating the authorized user in the nonvolatile memory 35. However, in the case where it is unnecessary to rewrite the encryption key and the password, the encryption key and the password may be stored in the ROM 34.

In the first embodiment, the information processing system 1 includes the IC card 30 as the portable information storage medium. However, the information processing system 1 may include another portable information storage medium having a similar function, such as an IC tag.

As shown in FIG. 11, an information processing device 10-4 (10-4A, 10-4B, or 10-4C) may include a computer 10'-4 (10'-4A, 10'-4B, or 10'-4C) and a storage device 19-4 which is connected with the computer 10'-4 through a communication line 50-4 such as an in-house LAN or the like and stores an encrypted file or the like instead of the magnetic disk 19 in the first embodiment, the second embodiment, or the third embodiment. The computer 10'-4 is a computer having a configuration similar to that of the information processing device 10, 10-2, or 10-3 and capable of performing communication through the communication line 50-4. The storage device 19-4 is also a computer having the same configuration. The computer 10'-4 encrypts data processed by an application program or the like according to a request from the user, and stores the encrypted data in the storage device 19-4. The computer 10'-4 decrypts and reads the data.

An encrypted file stored in the storage device 19-4 can be used in common by allowing the users of the computers 10'-4A, 10'-4B, and 10'-4C to use a single group key, whereby convenience can be improved.

FIG. 12 is a diagram showing the folder information stored in the magnetic disk 19.

The information processing device 10, 10-2, or 10-3 may include a time acquisition section such as a clock. As shown in FIG. 12(*a*), the magnetic disk 19 may store folder information in which time information is associated with the folder name, and the decision section 115 refers to the time indicated by the clock and the time information associated with the folder containing the target file of a save request or a read request from the user to decide whether or not to respond to the request. The time acquisition section is means which acquires time, and may be a clock provided in the information processing device 10, 10-2, or 10-3, or means which acquires time from the outside (CPU, communication means, or the like). The time information is information which indicates the time range (time zone) within which the corresponding folder can be accessed.

This processing of the information processing device 10, 10-2, or 10-3 is described below in detail using FIG. 7. After confirming that the folder designated by a write request or a read request is registered in the folder information (S420), the encryption/decryption application (decision section 115) decides whether or not to respond to the request based on the time indicated by the clock and the time information included in the folder information (not shown). The information processing device 10, 10-2, or 10-3 displays occurrence of an error when the encryption/decryption application has decided "NO" (S510), or performs processing for responding to the user's request when the encryption/decryption application has decided "YES" (S430 to S500), and finishes the processing.

As shown in FIG. 12(*b*), the information processing device 10, 10-2, or 10-3 may store the time information while associating the time information with each application (attribute such as extension) using a file, and may perform the processing in the same manner as described above.

The file access conditions can be more finely set by setting the time zone in which the encryption and decryption processing can be performed in units of folders and attributes, whereby security can be improved. Since the encryption/decryption application monitors a write request and a read request from the user's application to the OS as described in each embodiment, file access restriction processing based on the time information can be easily performed.

EXPLANATION OF SYMBOLS

Figure 1:
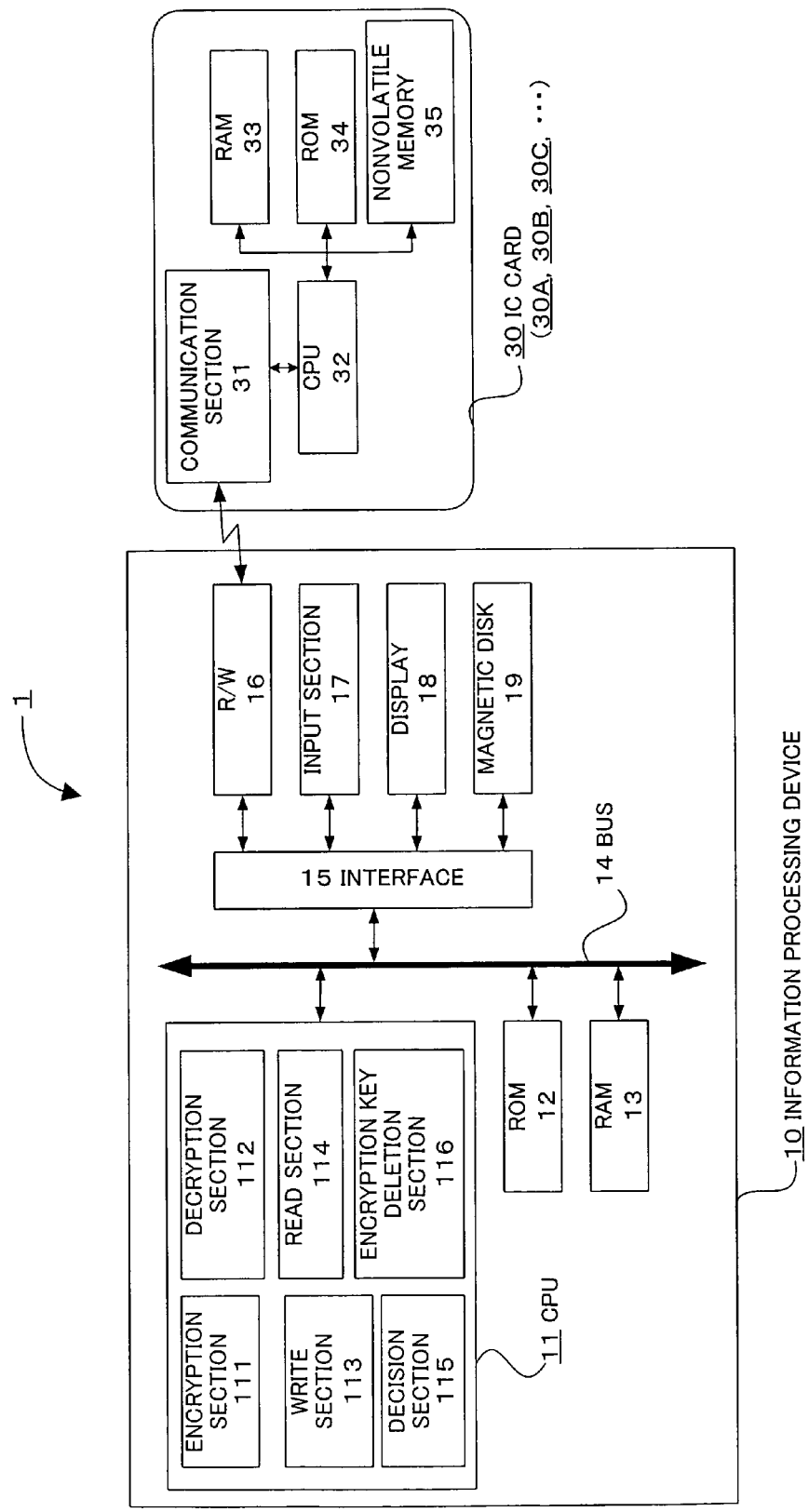
FIG. 1 is a block diagram showing a configuration of an information processing device and an information processing system (first embodiment).
Figure 2:
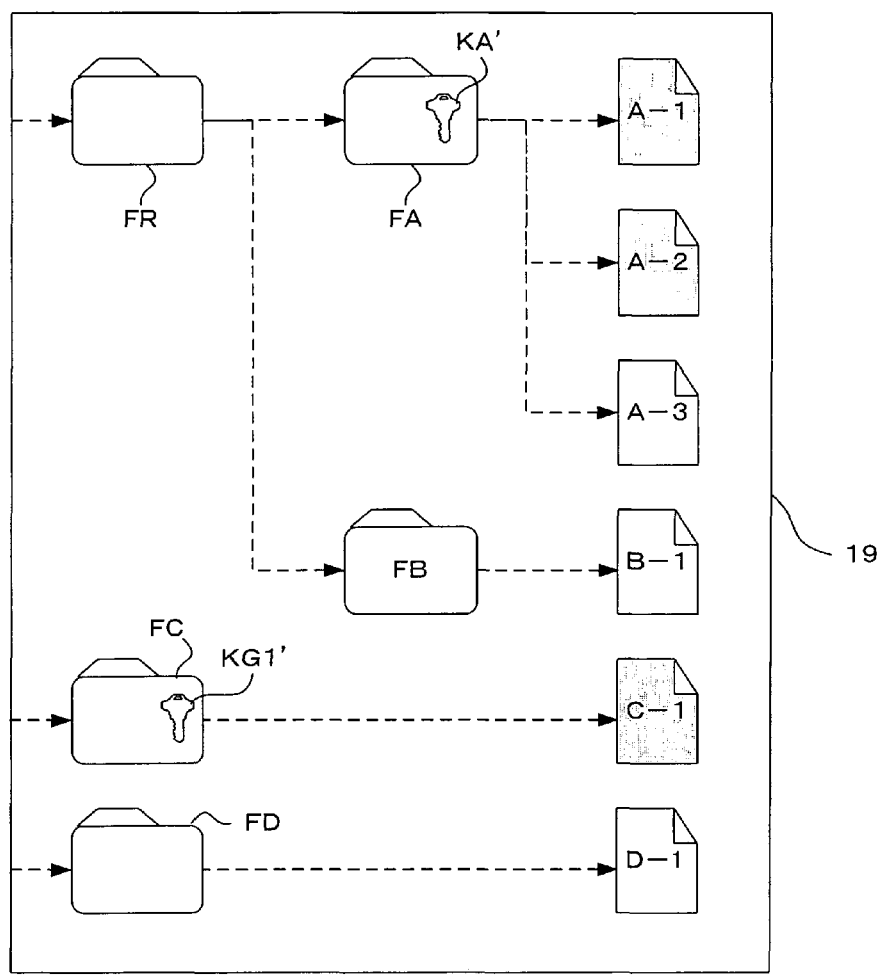
FIG. 2 is a diagram showing a file configuration in a memory region of a magnetic disk 19.
Figure 3:
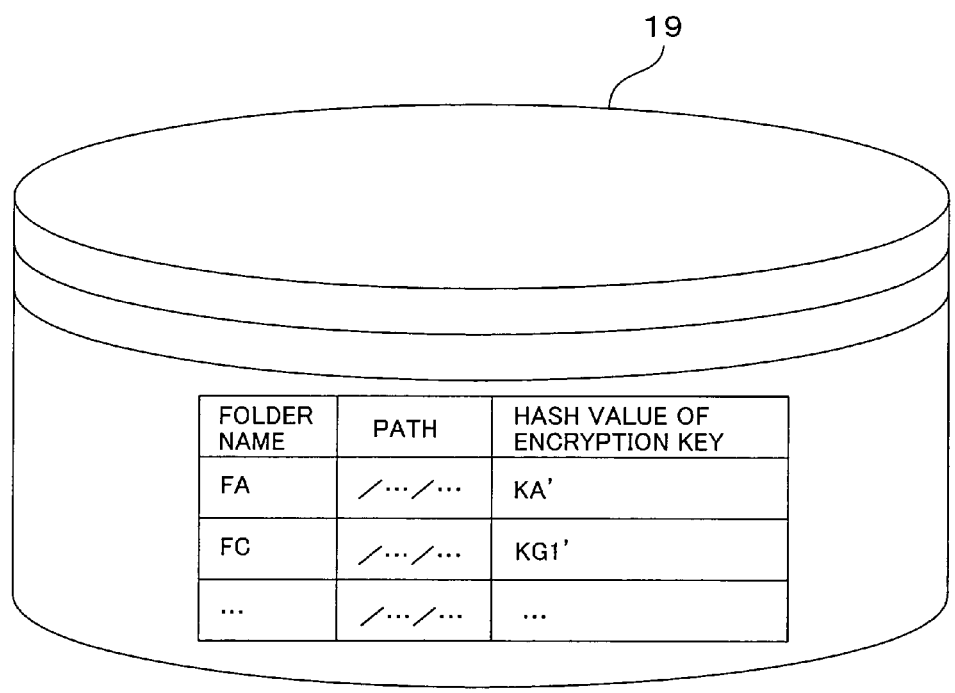
FIG. 3 is a diagram showing folder information stored in a magnetic disk 19.
Figure 4:
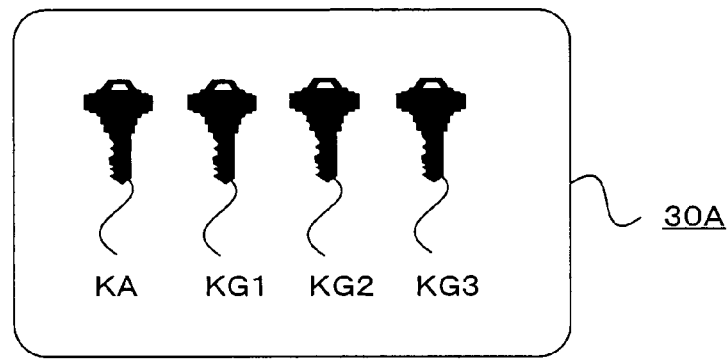
FIG. 4 is an explanatory diagram illustrative of encryption keys stored in each IC card 30.
Figure 4:
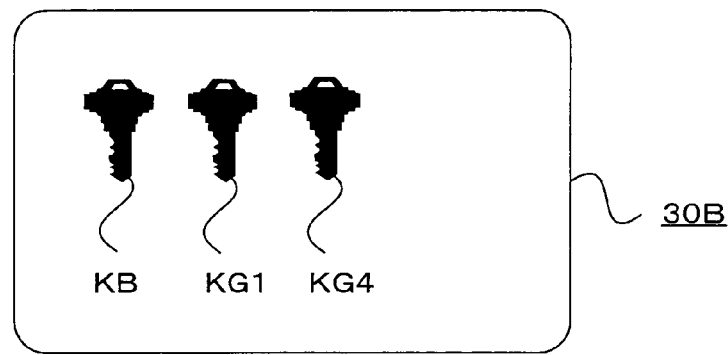
Figure 4:
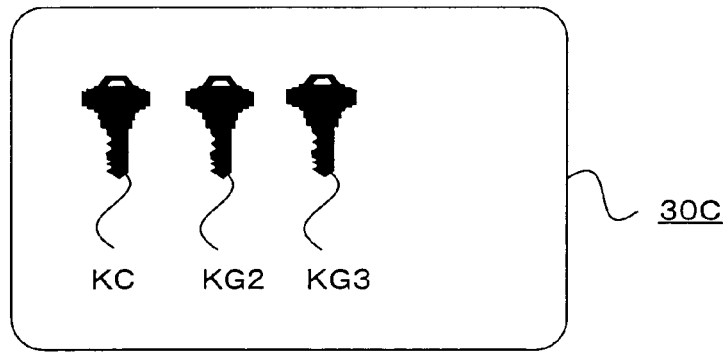
Figure 5:
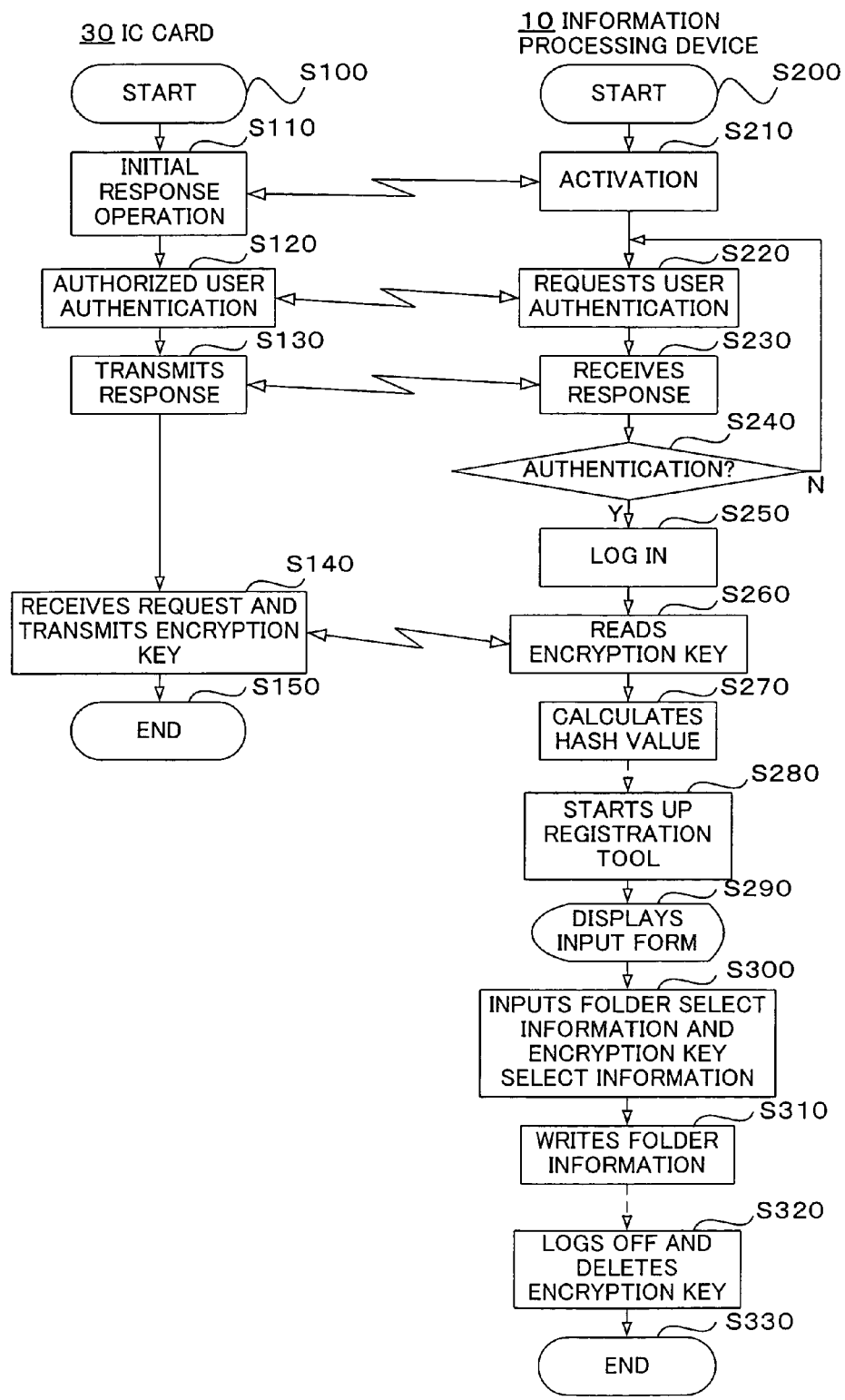
FIG. 5 is a flowchart showing startup of an information processing device and folder information registration processing.
Figure 6:
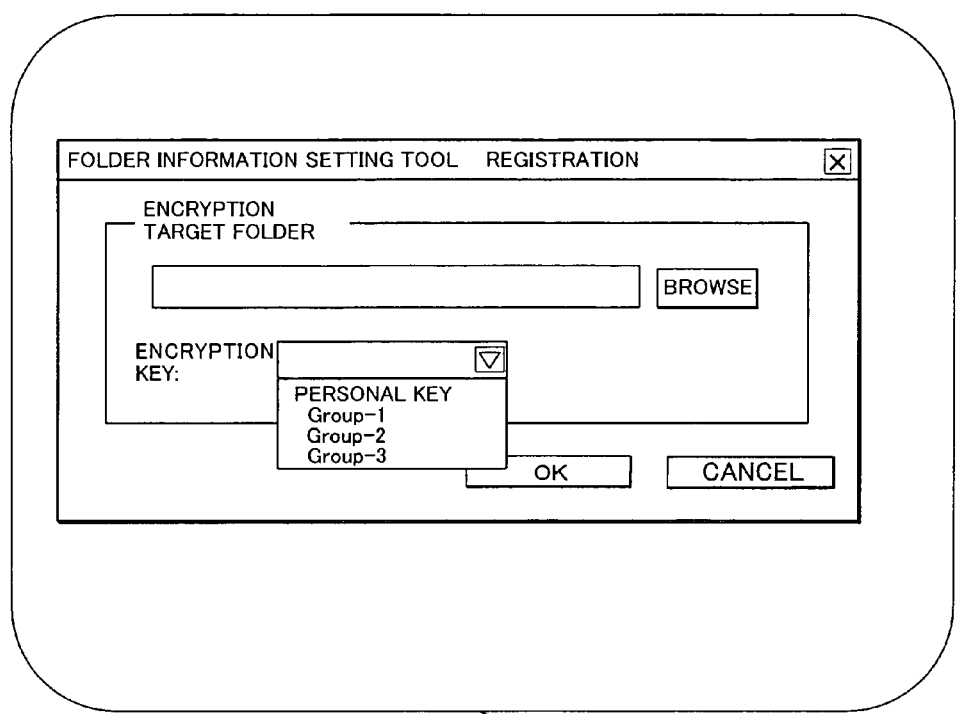
FIG. 6 is a diagram showing a display screen of a display 18 during registration of folder information.
Figure 7:
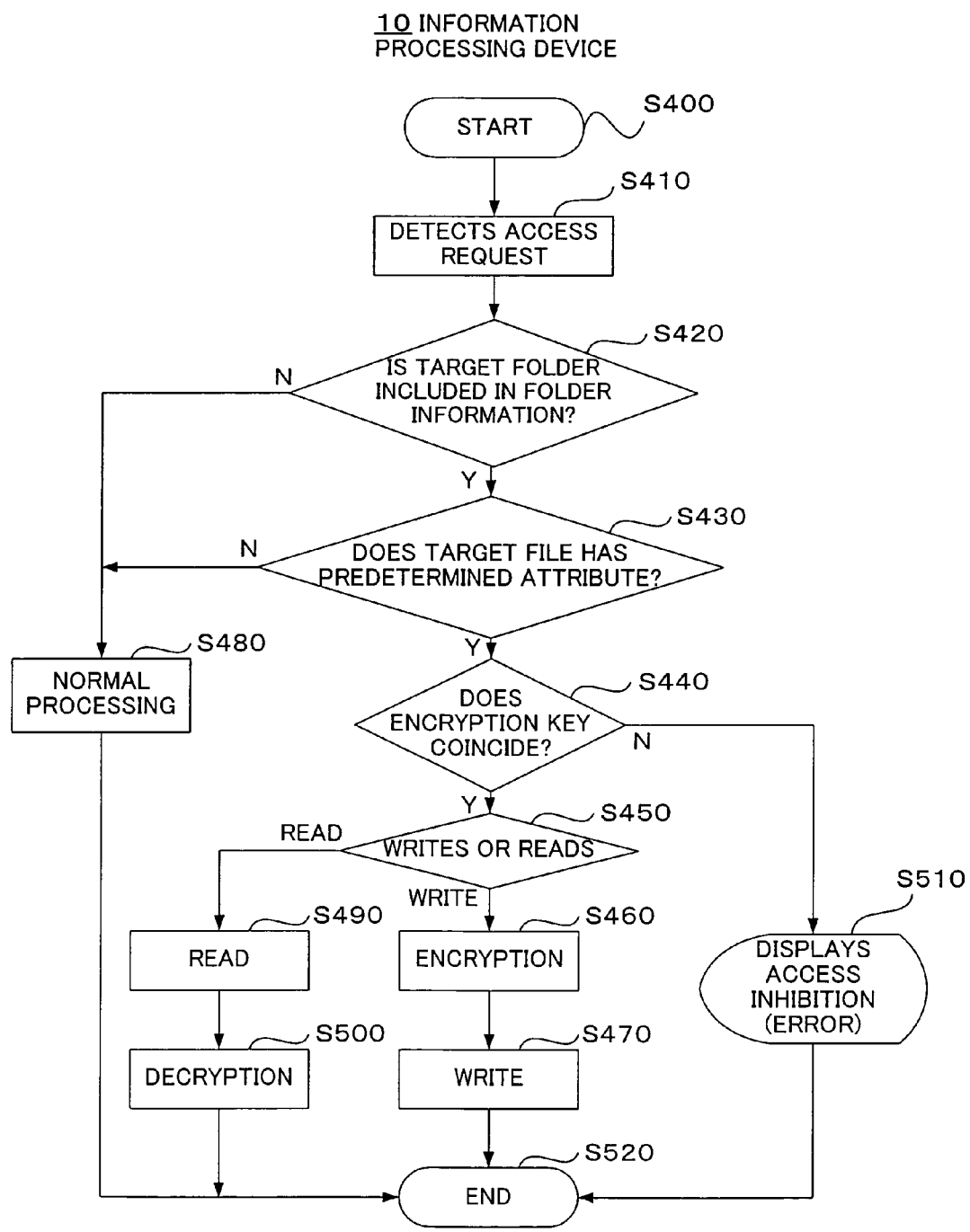
FIG. 7 is a flowchart showing save processing and read processing of a file performed by an information processing device.
Figure 8:
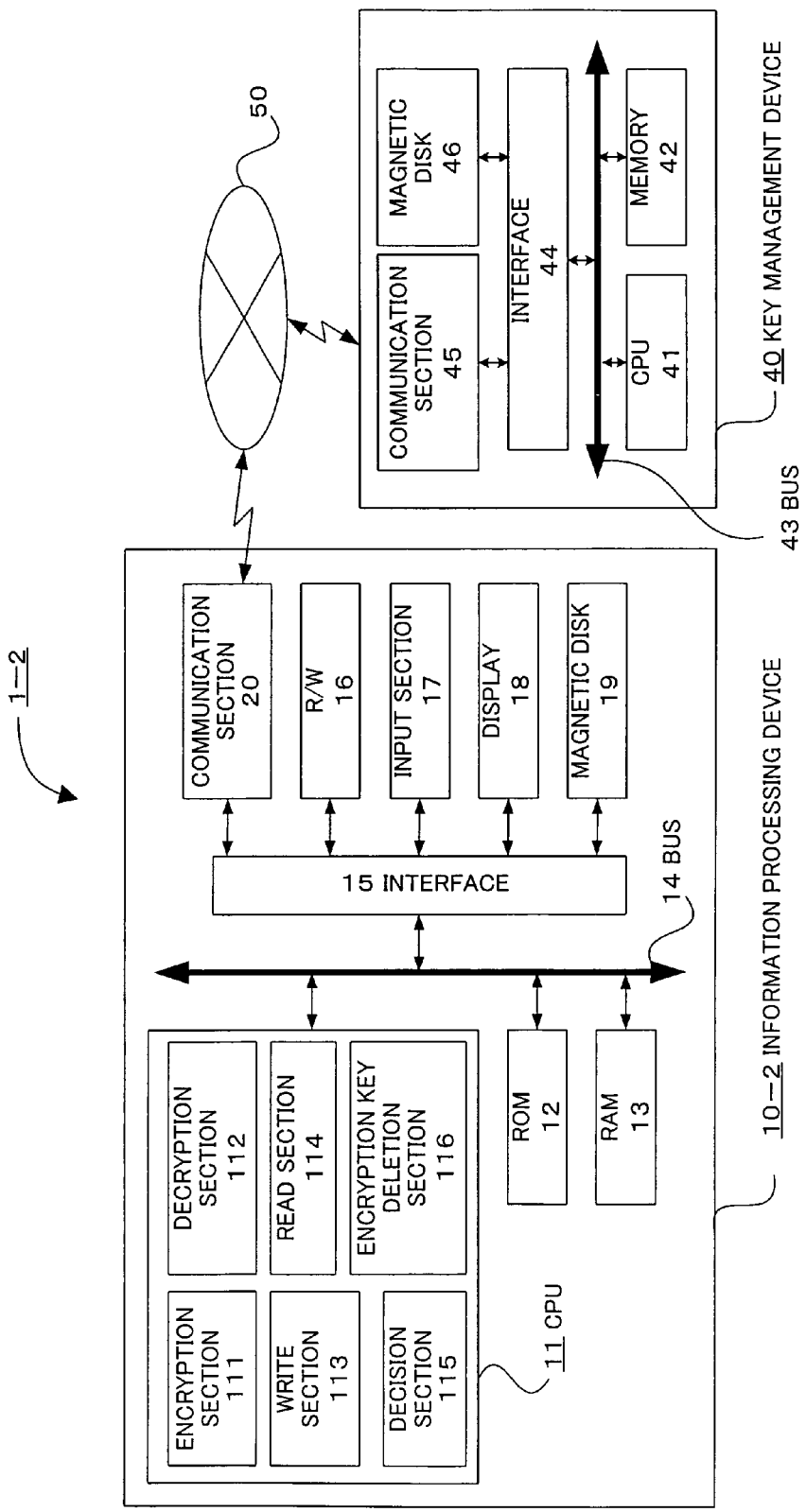
FIG. 8 is a block diagram showing a configuration of an information processing device and an information processing system (second embodiment).
Figure 9:
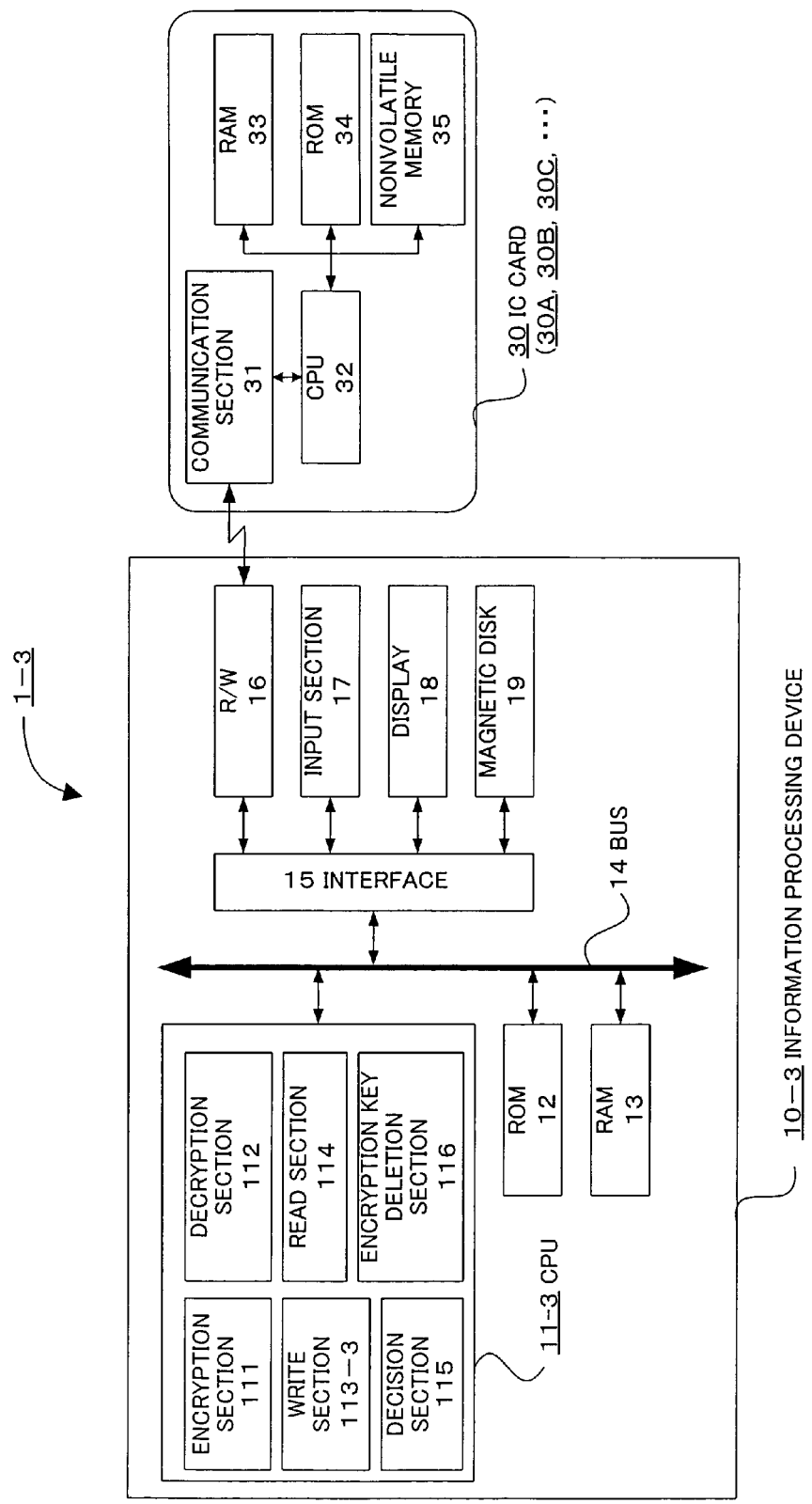
FIG. 9 is a block diagram showing a configuration of an information processing device and an information processing system (third embodiment).
Figure 10:
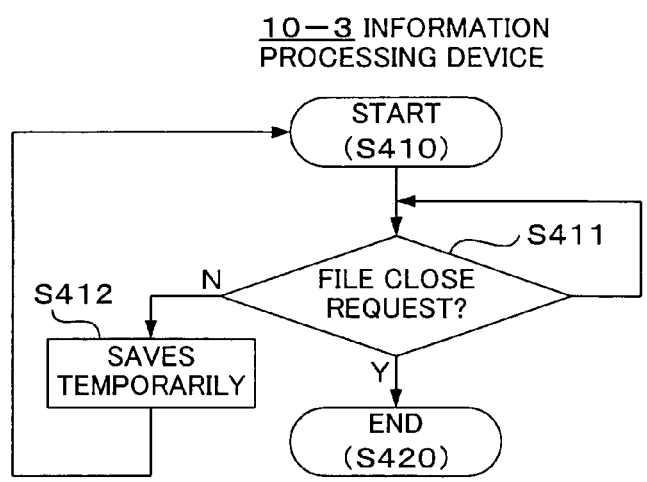
FIG. 10 is a flowchart showing a part of file save processing of an information processing device during editing.
Figure 11:
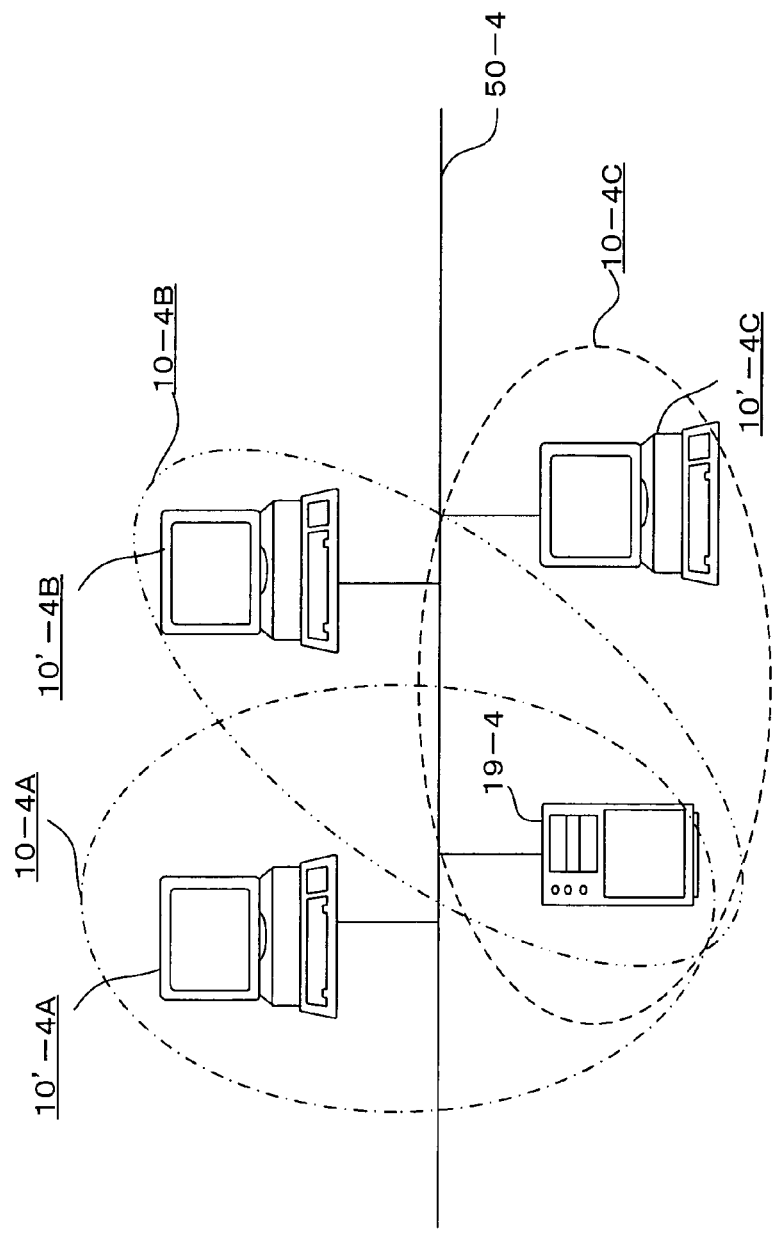
FIG. 11 is a block diagram showing a configuration of an information processing device (modification).
Figures 12A, 12B:
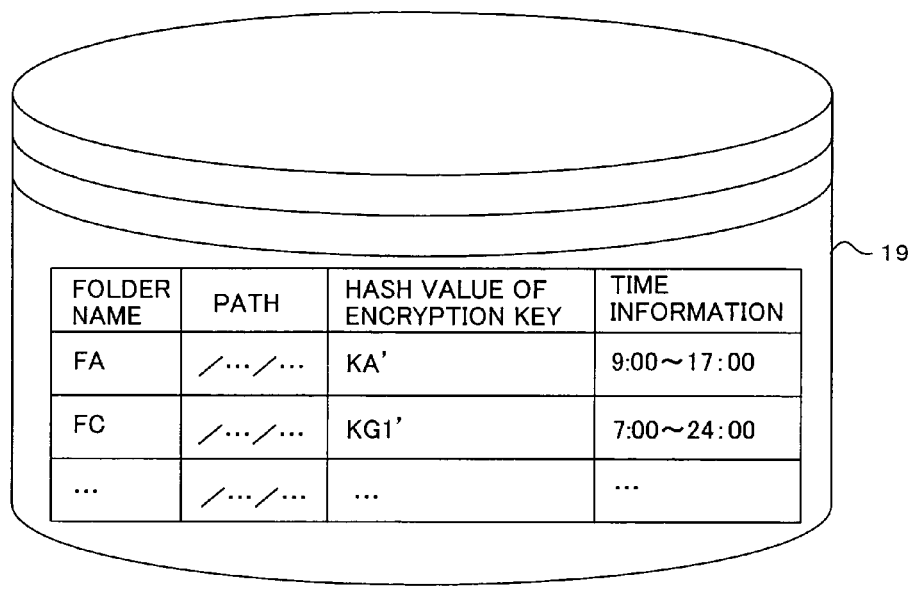
FIG. 12 is a diagram showing folder information stored in a magnetic disk 19.

1: Information processing system
10: Information processing device
11: CPU
16: R/W
19: Magnetic disk
20: Communication section
30: IC card
31: Contact terminal
32: CPU
35: Nonvolatile memory
40: Key management device
50: Communication line
111: Encryption section
112: Decryption section
113: Write section
114: Read section
115: Decision section
116: Encryption key deletion section

The invention claimed is:

1. An information processing device comprising:
   encryption information storage means for storing encryption information in a database form that associates a folder, in which at least one file is stored in a hierarchical file structure, with identification information of a first encryption key corresponding to the folder;
   external read means for reading information stored in a portable information storage medium that stores a second encryption key including at least one of a personal key, a group key, and an element of the user's encryption key;
   encryption key decision means for deciding, when a save request for a file into the folder has been issued from the user, if the first encryption key corresponding to the folder designated as a save destination for a target file of the save request also corresponds to the second encryption key stored in the portable information storage medium, based on the encryption information stored in the encryption information storage means and the encryption information read by the external read means;
   data encryption means for encrypting the target file of the save request using the first encryption key corresponding to the folder and transmitted to the information processing device when the encryption key decision means has decided "YES";
   error processing means for displaying occurrence of an error when the encryption key decision means has decided "NO";
   nonvolatile storage means for storing a file to save;
   write means for writing the target file encrypted by the data encryption means in the nonvolatile storage means; and
   encryption key deletion means for deleting the first encryption key corresponding to the folder and transmitted to the information processing device when the information processing device enters a log-off-state.

2. The information processing device as defined in claim 1, wherein the data encryption means performs encryption which does not cause a data size of the file to be changed before and after encryption and/or encryption which does not rewrite attribute information of the folder.

3. The information processing device as defined in claim 1, wherein, when a read request for a file included in the folder or the file has been issued from a user, the encryption key decision means decides whether or not the first encryption key corresponding to the folder in which a target file of the read request is saved, is included in the information read by the external read means based on the encryption information stored in the encryption information storage means;
   the information processing device further comprising:
   read means for reading the target file of the read request stored in the nonvolatile storage means when the encryption key decision means has decided "YES"; and
   data decryption means for decrypting the file read by the read means using the corresponding encryption key.

4. The information processing device as defined in claim 1, wherein the encryption information storage means stores the encryption information in which a folder designated by a user is associated with a hash value containing identification information of said second encryption key which can be read by the external read means.

5. The information processing device as defined in claim 1, wherein the encryption information storage means stores the encryption information in which identification information of the folder is associated with encryption key identification information including a hash value of the second encryption key.

6. The information processing device as defined in claim 1, wherein the data encryption means and/or the data decryption means encrypts or decrypts only a file having a predetermined attribute.

7. The information processing device as defined in claim 1, further comprising:
   time acquisition means and;
   time decision means,
   wherein the encryption information storage means stores the encryption information that associates the identification information of the first encryption key corresponding to the folder with corresponding time information; and
   wherein the time decision means decides, when a save request or a read request has been issued from a user, whether or not to respond to the request based on time indicated by the time acquisition means and time information corresponding to the folder that is designated as a destination to save the target file of the save request or the read request, or a file stored therein, stored in the encryption information storage means.

8. The information processing device as defined in claim 7, wherein the encryption information storage means stores the encryption information in which time information corresponding to an attribute of the folder or the file is associated with the folder.

9. The information processing device as defined in claim 1, wherein, when a save request for a file in an open state has been issued, the data encryption means encrypts the file using a corresponding encryption key only when the save request is a save request upon completion of editing of the file;
   wherein, when a save request for the file in an open state has been issued and said save request is a temporary save request that is only a save request during editing of the file, the write means stores the file as plaintext file data in the nonvolatile storage means; and
   wherein the information processing device comprises a central processing unit that deletes the plaintext file data stored by the write means upon encryption of an edited file by the data encryption means and storage of the encrypted file in the nonvolatile storage means.

10. The information processing device as defined in claim 1, wherein the data encryption means encrypts only a file in a folder designated by a user in advance.

11. An information processing system, comprising:
    the information processing device as defined in claim 1; and
    wherein the portable information storage medium comprises at least one of an IC card and IC tag of the user, and the portable information storage medium performs communication with the external read means.

12. The information processing system as defined in claim 11, wherein the portable information storage medium stores authentication information for authenticating an authorized user, includes authentication decision means for deciding whether or not to authenticate a user as the authorized user based on the authentication information and user input information input from the information processing device, and allows the external read means of the information processing device to read the second encryption key or the element stored in the portable information storage medium when the authentication decision means has decided "YES".

13. The information processing system as defined in claim 11,
wherein the portable information storage medium stores device identification information for identifying the information processing device, and allows the second encryption key or the element to be read when a request is issued from the information processing device indicated by the device identification information.

14. An information processing system, comprising:
the information processing device as defined in claim 1; and
a key management device which includes authentication information storage means for storing authentication information for authenticating an authorized user, authentication decision means for deciding whether or not to authenticate a user as the authorized user based on the authentication information stored in the authentication information storage means and user input information received from the information processing device, encryption key storage means for storing the second encryption key including a personal key and/or a group key or an element of the second encryption key which can be used by the authorized user decided by the authentication decision means, and transmission means for transmitting the second encryption key or the element to the information processing device when the authentication decision means has decided "YES", and is connected with the information processing device through a communication line;
wherein the information processing device includes transmission means for transmitting the user input information to the key management device, and reception means for receiving the second encryption key or the element which can be used by the authorized user authenticated by the authentication decision means of the key management device based on the user input information from the key management device; and
wherein, when a save request or a read request of the file has been issued, the encryption key decision means of the information processing device decides whether or not a first encryption key or an element corresponding to the folder for a target file of the save request or the read request is included in the first encryption key or the element corresponding to the folder for a target file is included in the second encryption key or the element received by the reception means from the key management device based on the encryption information stored in the encryption information storage means.

15. The information processing system as defined in claim 14,
wherein the encryption key storage means of the key management device stores device identification information for identifying the information processing device while associating the device identification information with the second encryption key or the element, and the transmission means transmits the second encryption key or the element only to the information processing device indicated by the device identification information corresponding to the second encryption key or the element.

16. The information processing system as defined in claim 11,
wherein the information processing device does not respond to a save request and/or read request from a user when a communication path with an external device other than a predetermined external device including the portable information storage medium or the key management device which has provided the encryption key or the element is established.

17. The information processing system as defined in claim 11,
wherein the information processing device includes encryption key deletion means for deleting the second encryption key and/or the element respectively provided from one of the portable information storage medium and the key management device and stored in the information processing device when a communication path with one of the portable information storage medium and the key management device is disabled.

18. The information processing system as defined in claim 11,
wherein one of the portable information storage medium and the key management device stores device identification information for identifying the information processing device while associating the device identification information with the corresponding second encryption key or the element; and
wherein the information processing device includes device identification information decision means for deciding if to respond to save requests and read requests from a user, based on one of the device identification information read by the external read means from the portable information storage medium and the device identification information received from the key management device and corresponding to one of the encryption key and the element received by the reception means from the key management device.

19. A non-transitory computer-readable storage medium including an executable program stored thereon for execution by an information processing device, wherein:
the information processing device comprising encryption information storage means for storing encryption information that associates a folder, in which at least one file is stored in a hierarchical file structure, with identification information of an encryption key corresponding to the folder and nonvolatile storage means for storing a target file to save, and performing processing according to an application program, and
wherein the program comprises:
an external read procedure for reading information stored in a portable information storage medium that stores a second encryption key including at least one of a personal key, a group key, and an element of a user's encryption key;
a first decision procedure for deciding, when a write request for the file into the folder has been issued from the application program, whether or not the first encryption key corresponding to the folder designated as a write destination for a target file of the write request also corresponds to the second encryption key stored in the portable information storage medium, based on the encryption information stored in the encryption information storage means and the information read by the external read procedure;
a data encryption procedure for transmitting the encryption key corresponding to the folder to the information processing device and encrypting the target file of the write request using the first encryption key corresponding to the folder when "YES" in the first decision procedure;
a write procedure for writing the target file encrypted in the data encryption procedure into the nonvolatile storage means; and an encryption key deletion procedure for deleting the first encryption key corresponding to the folder and transmitted to the information processing device.

20. The program as defined in claim 19, further comprising:

a second decision procedure for deciding, when a read request for a file included in the folder has been issued from the application program, whether or not an encryption key corresponding to the request target file is included in the information read by the external read means based on the encryption information stored in the encryption information storage means;

a read procedure for reading a target file of the read request stored in the nonvolatile storage means when "YES" in the second decision procedure; and a data decryption procedure for decrypting the target file read in the read procedure using the corresponding encryption key.

21. The program as defined in claim 20, wherein the first and/or second decision procedure decides whether or not an encryption key or an element of the encryption key corresponding to the folder for a target file of the write request or the read request is included among encryption keys or an element of the encryption key which can be used by an authorized user input from an external device which has authenticated the user as the authorized user.

22. The program as defined in claim 19, wherein, when a write request for a file in an open state has been issued from the application program, the data encryption procedure encrypts the file using the corresponding encryption key only when the write request is a save request upon completion of editing of the file.

23. The program as defined in claim 19, wherein the data encryption procedure encrypts only a file designated by a user in advance in a folder designated by a user in advance.

* * * * *